United States Patent [19]

Wolters

[11] 4,359,970

[45] Nov. 23, 1982

[54] INTERNAL COMBUSTION ENGINE UTILIZING PARTICULATE FUEL

[75] Inventor: Clemens A. Wolters, Delaware, Ohio

[73] Assignee: Clements Corp., Marion, Ohio

[21] Appl. No.: 245,272

[22] Filed: Mar. 19, 1981

[51] Int. Cl.³ .............................................. F02B 45/02
[52] U.S. Cl. ...................................................... 123/23
[58] Field of Search ...................... 123/23, 24 R, 531; 60/39.46 S

[56] References Cited

U.S. PATENT DOCUMENTS

| Re. 11,900 | 4/1901 | Diesel | 123/23 |
| 820,495 | 5/1906 | Honeywell | 123/23 |
| 1,191,072 | 7/1916 | Fessenden | 123/23 |
| 1,645,836 | 10/1927 | Van Deventer | 123/23 |
| 1,696,475 | 12/1928 | Elliott et al. | 123/23 |
| 1,810,768 | 6/1931 | Holzwarth | 123/23 |
| 1,861,379 | 5/1932 | Bowes | 123/23 |
| 1,897,819 | 2/1933 | Pawlikowski | 123/23 |
| 1,921,132 | 8/1933 | Pawlikowski | 123/23 |
| 2,396,524 | 3/1946 | Nettel | 123/23 |
| 2,439,748 | 4/1948 | Nettel | 123/179 |
| 2,625,141 | 1/1953 | Berlyn | 123/25 |
| 2,836,158 | 5/1953 | Harvey | 123/23 |
| 3,981,277 | 9/1976 | Abom | 123/23 |
| 4,052,963 | 10/1977 | Steiger | 123/23 |
| 4,056,080 | 11/1977 | Rutz et al. | 123/23 |
| 4,059,077 | 11/1977 | Steiger | 123/23 |
| 4,070,996 | 1/1978 | Steiger | 123/23 |
| 4,070,997 | 1/1978 | Steiger | 123/23 |
| 4,086,883 | 5/1978 | Steiger | 123/23 |

Primary Examiner—William A. Cuchlinski, Jr.
Attorney, Agent, or Firm—Mueller and Smith

[57] ABSTRACT

An internal combustion engine utilizing particulate fuel such as coal dust having a fuel delivery system wherein a mixing component is provided having a metering and a pressurized air duct assembly. During a compression stroke, this mixing component is moved into registry with an intake port and the particulate fuel within the metering duct is driven into the combustion chamber and a suspension thereof is formed within the chamber. A screw conveyor is utilized to transport the particulate fuel continuously between the metering duct and source.

19 Claims, 7 Drawing Figures

INTERNAL COMBUSTION ENGINE UTILIZING PARTICULATE FUEL

BACKGROUND

Internal combustion engines designed to achieve a useful power output through the control combustion of solid powdered fuels, such as coal, have been proposed and fabricated in prototype stages essentially since the early investigations of Rudolph Diesel. Generally, the difficulties encountered by investigators in connection with these engines have centered about the development of techniques for forming and controlling a particulate fuel-air mixture for introduction in properly timed fashion into a combustion chamber.

In typical engine design approaches, a particulate formed of powdered coal and air is conveyed to an intake manifold, pre-combustion chamber or the like, whereupon the suspension is directed to a combustion region for ignition. The maintenance of the particulate suspension during this procedure has been seen to be difficult, resulting in unwanted powder accumulation and degradation of desired fuel-air ratios. Approaches intended to maintain a proper particulate suspension have included, for example, "animators" serving to agitate particles within the suspension as it awaits introduction to the region of combustion. Loss of consistency in a predetermined and desired suspension necessarily results in a loss of accurate metering of fuel into the combustion chamber leading to vagaries in cylinder power output.

Another operational difficulty typically encountered in the past stems from the utilization of conventional valve structures. Such structures may not close tightly, inasmuch as dust particles tend to build up upon the seating surfaces thereof. Accordingly, the submission of the particulate fuel suspension to the combustion chamber of the engines preferably should be under the control of valving which is immune from deficient operation resulting from clogging or particle buildup.

Because solid particulate fuel such as coal dust is available in bulk form and is subject to varying degrees of bulk compaction and moisture content, it is necessary that engine support systems utilizing the coal powder be capable of transporting it in predictable and uniform fashion. Where dynamic variables are involved in this transportation, opportunity exists for the loss of desired air-fuel ratios and consequently undersirable engine performance. Related hindrances to the desired operation of the engines develop in the course of carrying out throttling functions. Where throttling procedures are performed upon the particulate fuel alone, i.e., not in suspension, somewhat downstream of combustion, lags and inaccuracies may result in consequence of the nature of the fuel delivery system itself as well as in variations in the consistency of the bulk fuel. On the other hand, where throttling occurs as a control over the amount of particulate suspension submitted to the combustion chamber, then valving difficulties may well be encountered.

Concerning the handling and storage of fuel itself, coal dust obtained from the mine production environment may exhibit varying degrees of moisture content. Even where this mositure content can be standardized, the storage of the dust may lead to variations of that value in view of the wide geographical regions within which it may be used. Such variations in moisture content pose vagaries which must be accounted for in connection with the delivery system of the fuel at the side of the engine. Thus, the characteristic of the fuel itself is not entirely uniform, a condition requiring a different form of fuel handling than industry has been acquainted with heretofore in conjunction with reasonably uniform liquid base fuels. However, in view of the growing costs associated with fluid hydrocarbon fuels, and in view of the very low cost of coal dust as a fuel, a practical internal combustion engine powered by coal dust now represents a viable alternative source of power.

SUMMARY

The present invention is addressed to an internal combustion engine utilizing coal dust or other combustible particulate material as fuel and which provides a highly practical derivation of a particulate fuel-air distribution within the combustion chamber thereof. With the invention, an injecting valve arrangement is provided wherein particulate fuel is continuously delivered in bulk to an injection valve which incorporates a metering duct, the relative movement of which serves to accurately control the bulk amount of fuel admitted to the engine. The metering duct is operationally associated with an air supply suct such that pressurized air and fuel are conjoined essentially at the intake port of the engine to effectively form the requisite fuel-air distribution within the combustion chamber itself during a compression stroke. With this approach, development of this fuel-air suspension at the correct instant of engine performance is assured and the manyfold difficulties heretofore encountered in establishing and maintaining such a suspension are avoided. Because the valve itself serves to carry bulk fuel, the difficulties attendant with the buildup of fuel dust upon valving components are eliminated, such fuel buildup being utilized in and of itself as an operational aspect of the engine. The injecting valve includes a mixing component which incorporates the noted metering duct for fuel as well as an air supply duct, and the component itself is driven in reciprocal fashion in association with the engine cycle. Such reciprocal movement also serves to maintain the bulk fuel in an agitated state again to enhance the evolution of the requisite fuel-air suspension. In a preferred embodiment, the air input duct is associated with the metering duct in a manner wherein solid fuel is drawn from the latter by a Venturi effect derived by the conjoining association of the two ducts.

Throttling control over the engine is carried out, inter alia, by the utilization of a selectively variable cam drive of the mixing component. Thus, by altering the position of a rising profile on the drive cam, the degree of movement of the mixing component may be varied to, in turn, simultaneously adjust the amount of fuel and air conjoined at the intake port of the engine.

To improve the movement of fuel from a source, a transport arrangement is provided wherein a conveyor continuously circulates bulk quantities of fuel to the injecting valve assembly and returns it to the source of fuel. With this arrangement, the injecting valve assembly utilizes only that amount of fuel which it requires from the continuously circulating fuel arrangement. To assure a relative consistency in the quality of particulate fuel delivered, an embodiment of the invention provides for the packaging of the fuel in a polymeric container which is punctured automatically upon insertion within a retainer. This retainer incorporates an insertable conduit which is injectable into the package of fuel and which is associated with the conveyor portion of the earlier described fuel transport assembly.

As another object and feature of the invention, an internal combustion engine utilizing particulate fuel and incorporating at least one cylinder having a wall defining a combustion chamber is provided wherein a piston is positioned for reciprocal movement. An intake port is provided which extends through the cylinder wall which effects the passage of a particulate solid fuel and air into the combustion chamber to evoke the noted fuel-air suspension. An injecting valve arrangement is provided which is positioned adjacent to the cylinder wall and has an outlet communicable with the intake port. A metering duct is provided within the injecting valve arrangement which extends from a particulate fuel inlet toward the outlet, and an air supply duct also is provided within the injection valve arrangement which extends from a pressurized air inlet toward the outlet. The injecting valve is actuable to move with respect to the intake port to selectively effect an intermittent conjoining of the pressurized air from the air supply duct with the particulate from within the metering duct and provides a substantially simultaneous injection of the fuel and air into the intake port. Additionally, an actuating arrangement is provided for selectively actuating the injection valve arrangement.

As another object and feature, the invention additionally provides a transport arrangement for continuously transporting the particulate fuel, in delivery, from a source to the injecting valve arrangement and from that injecting valve arrangement, in return, to the source. A fuel outlet arrangement is provided which communicates the injecting valve metering duct with the transport arrangement for converting a portion of the particulate fuel thereinto in accordance with the throttle setting of the engine.

Other objects of the invention will, in part, be obvious and will, in part, appear hereinafter. The invention, accordingly comprises the apparatus and system possessing the construction, procedures, combination of elements and arrangement of parts which are exemplified in the following detailed disclosure.

For a fuller understanding of the nature and objects of the invention, reference should be had to the following detailed description taken in connection with the accompanying drawings.

DETAILED DESCRIPTION

Figure 1:
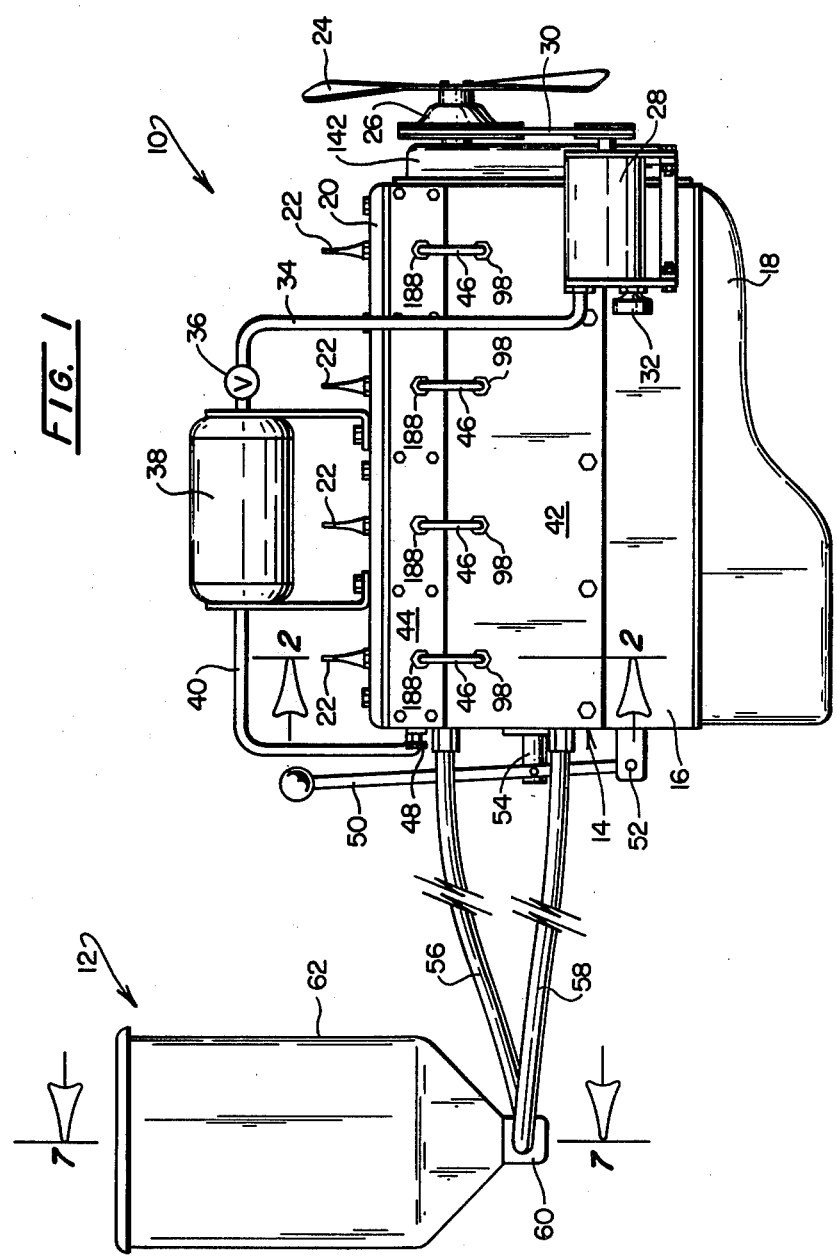
FIG. 1 is a side elevational view of an internal combustion engine according to the invention, additionally showing a fuel tank and transport arrangement.

Referring to FIG. 1, an internal combustion engine formed in accordance with the teachings of the invention is revealed generally at 10 operating in conjunction with a source of particulate fuel represented in general at 12. Engine 10, for illustrative purposes, is operated on a two-stroke cycle and incorporates conventional engine components such as a cylinder block 14, crankcase 16, oil pan 18 and headblock 20. Sparkplugs 22 are shown extending into the latter and are activated from an appropriate ignition arrangement (not shown). A fan blade is shown extending from the forward portion of the engine outwardly of a drive pulley 26, which, in turn, serves to drive an air pump 28 via fan belt 30. Air pump 28 serves as a source of pressurized air, includes an intake filter of conventional design 32 and provides a pressurized air output along conduit 34. Conduit 34 includes a check valve 36 and leads to one side of a pressurized air storage vessel 38. The output of storage vessel 38 is provided at conduit 40 which extends, in turn, to an input port contained within a fuel injection housing 42 bolted to the cylinder walls of cylinder block 14. Bolted in turn to the outer surface of fuel injection housing 42 and extending along the length thereof is an air valve housing 44. Air conduits 46 corresponding with the four cylinders of engine 10 are shown extending from air valve housing 44 to input ports within fuel injection housing 42. Also, extending from air valve housing 44 is a hand manipular air adjustment knob 48. Throttle control over engine 10 is provided by a throttle lever 50 which is pivotally connected to the engine at a pivot 52 and which is coupled pivotally to a cam extension 54. Thus, movement of throttle 50 toward and away from engine 10 provides for the corresponding movement of cam extension 54 into and out of fuel injection housing 42.

Particulate fuel such as coal dust is transported to fuel injection housing 42 via a screw feed type conveyor delivery portion 56 and is returned therefrom via a feed conveyor 58. Conveyors 56 and 58 circulate fuel across a fuel supply conduit or component 60 positioned at the tapered lower terminus of a fuel tank 62 of source 12.

Figure 2:
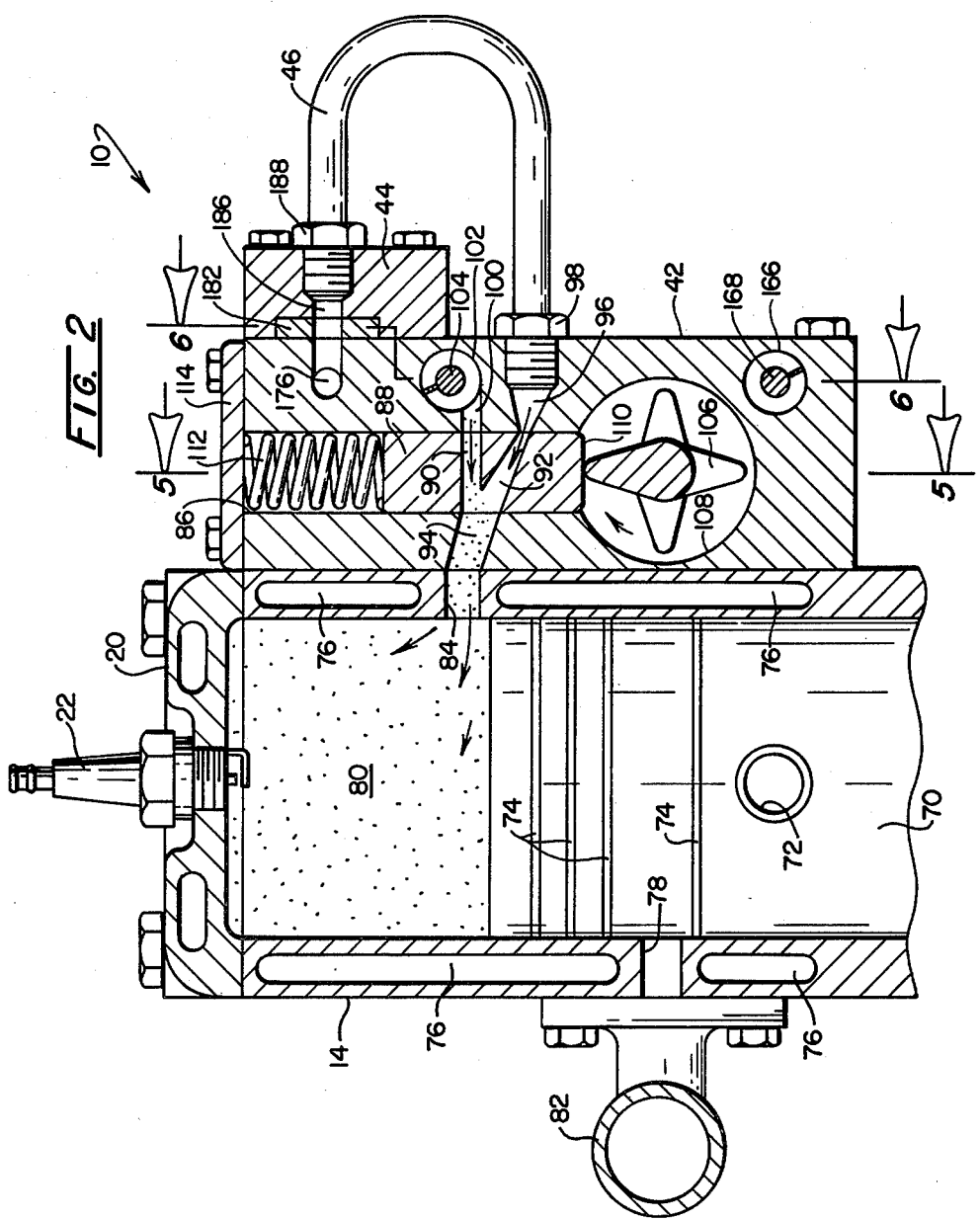
FIG. 2 is a partial sectional view of a cylinder and injection valve arrangement of the engine of FIG. 1 taken through the plane 2—2 thereof.

Referring to FIG. 2, the internal components of one cylinder of engine 10 are revealed as they are oriented at the commencement of a compression stroke. In the figure, a piston 70 having a conventional pin 72 and piston rings as at 74 is shown positioned within the walls of cylinder block 14. The cylinder walls of block 14 include liquid cooling chambers as at 76 and are further formed having exhaust ports as at 78 communicating with the combustion chamber represented generally at 80. Exhaust port 78 communicates with an exhaust manifold 82 which leads to an appropriate exhaust outlet (not shown). Exhaust port 78 is positioned slightly above the top of piston 70 when the latter is at an orientation at or close to bottom dead center. However, during a combustion stroke, as represented in the figure, port 78 is blocked by the piston, while an intake port 84 is unblocked and open to permit the injection of particulate fuel and pressurized air into chamber 80.

Now looking to the technique of that injection, fuel injection housing 42 is shown incorporating a vertical shaft or opening 86 within which a mixer component 88 is slidably positioned. Component 88 is non-round in transverse cross-sectional configuration such that it will not rotate within shaft 86 and is formed having two ducts 90 and 92 extending across it. Duct 90 is a metering duct which receives particulate fuel particles at its particulate fuel inlet and which are transferred to the outlet thereof which may include a short conduit or opening 94 leading to intake port 84. Communication of duct 90 with the intake port 84 is represented in FIG. 2 and is dependent upon the relative position of component 88. Duct 92 is an air input duct which also communicates with intake port 84 through outlet region 94. The pressurized air inlet of duct 92 is shown in communication with the air outlet 96 of a source of pressurized air which is developed from conduit 46 which is attached to outlet 96 through fitting 98. Correspondingly, the fuel inlet of duct 90 receives particulate fuel from a fuel outlet 100 which is in communication with the fuel transport arrangement which, within housing 42 comprises a horizontal bore 102 within which a continuous screw type conveyor 104 is driven. Accordingly, when mixer component 88 is in the position shown in FIG. 2, duct 90 is in a position to receive particulate fuel transported via conveyor 104 and tapped at outlet 100 for delivery in bulk form to duct 90. Simultaneously, duct 92 is positioned to receive air under pressure from outlet 96. Inasmuch as duct 92 is configured to intercept duct 90 at the region of outlet 94, a Venturi form of drive of the bulk fuel particles within duct 90 is provided to draw them from the duct and move them through intake port 84. As the particles and compressed air combination move through intake port 84, they are conjoined and dispersed within combustion chamber 86 to form a particulate fuel-air suspension for combustion. Note that the formation of this suspension takes place within the combustion chamber 80 itself as opposed to being preformed prior to entry. The buildup of particulate fuel within mixer component 88 is purposeful with the instant embodiment and, rather than serving as a detriment, is an advantage in the operation of engine 10.

Mixer component 88 is operatively positioned with respect to outlets 96 and 100 as well as outlet 94 by a rotatably driven cam 106 positioned within horizontal bore 108. In this regard, the lowermost surface 110 of component 88 serves as a cam follower which is driven by the cam drive profile of cam 106. It may be observed that this profile is steep such that movement of component 88 is quite rapid. Continuous seating of follower surface 110 upon the profile of cam 106 is assured by the bias asserted by a spiral spring 112, retained in place by a cap 114 which, in turn, is bolted to fuel injection housing 42.

Figure 5:
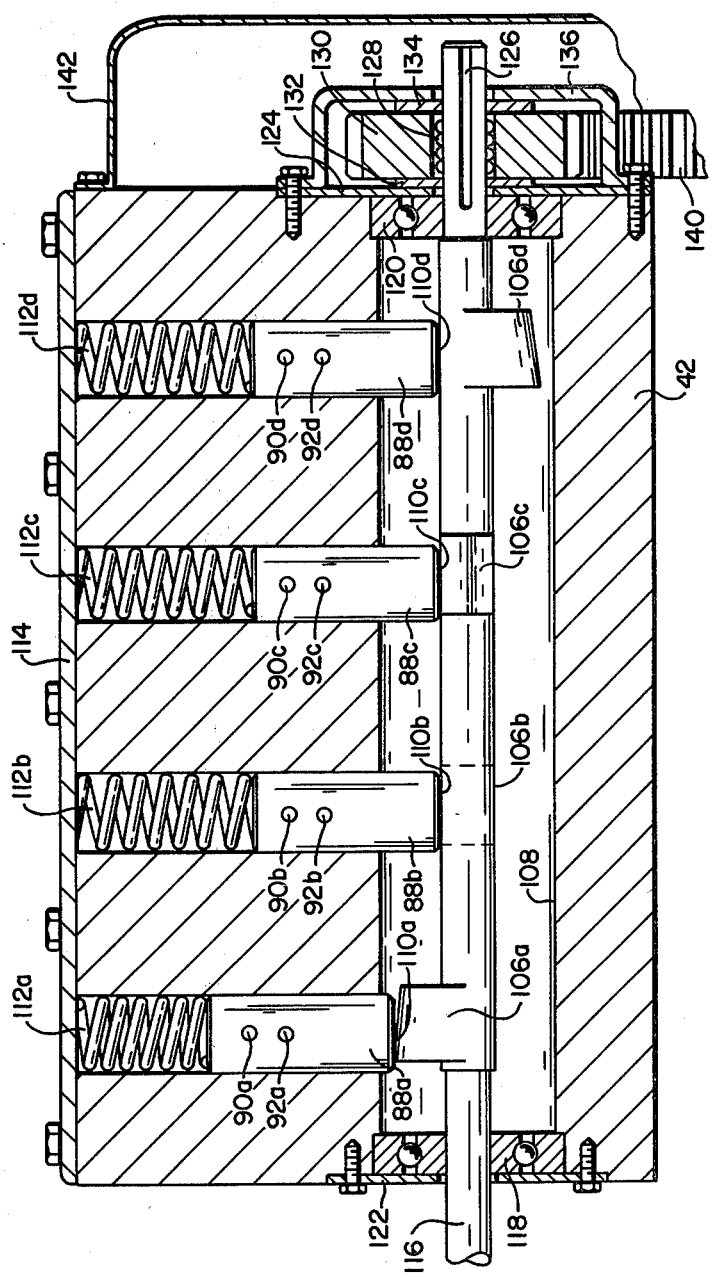
FIG. 5 is a partial sectional view taken through the plane 5—5 of FIG. 2.

Looking additionally to FIG. 5, the internal structure of fuel injection housing 42 is revealed with respect to all four illustrated cylinders of engine 10. Inasmuch as the mixer component 88 and associated structure are identical for each cylinder, the same numeration with alphabetical subscripting is provided in identification of the above-described components. FIG. 5 reveals that cams 106-d are mounted upon a shaft 116 which, in turn, is mounted for rotation upon two spaced bearings 118 and 120. Bearing 118 is retained in position by a coverplate 122 which, in turn, is affixed to housing 42 by machine screws. Correspondingly, gear 120 is retained in position by a cover plate 124 which is similarly attached to housing 42. Shaft 116 is shown extending outwardly from cover plate 124 and is formed having a plurality of grooves or raceways as at 126 within which are positioned ball bearings as at 128 which, in turn, extend above the raceway 126 into corresponding grooves formed within a cam drive gear 130. Washer bushings 132 and 134 serve to retain the ball bearings 128 in position and the entire gear assembly is retained in place by a retainer or cage 136 which is attached to housing 42 by machine screws as shown. Gear 130 is driven from a drive gear 140, in turn coupled to the crankshaft of engine 10. The entire gear assembly is protected by a gear cover 142.

The opposite side of shaft 116 is coupled with the earlier described extension 54 of throttle 50. (FIG. 1). Accordingly with the structure shown, the shaft may be moved or shifted along its axis by throttle 50 to, in turn, adjust the point of contact of each of the cams 106a–106d with a corresponding respective cam follower surface 110a–110d. FIG. 5 reveals that each of the cams 106a–106d are configured having a rising profile which serves to adjust the point of contact of the cams with follower surfaces 110a–110d. Returning to FIG. 2, it may be observed that by so adjusting shaft 116 with throttle 50, the amount or degree of registry od ducts 90 and 92 with corresponding outlets 100 and 96 may be varied to carry out throttling of the engine. In this regard, a simultaneous adjustment is simply provided wherein the amount of air under pressure admitted as well as the amount of fuel admitted is correspondingly adjusted.

Figure 6:
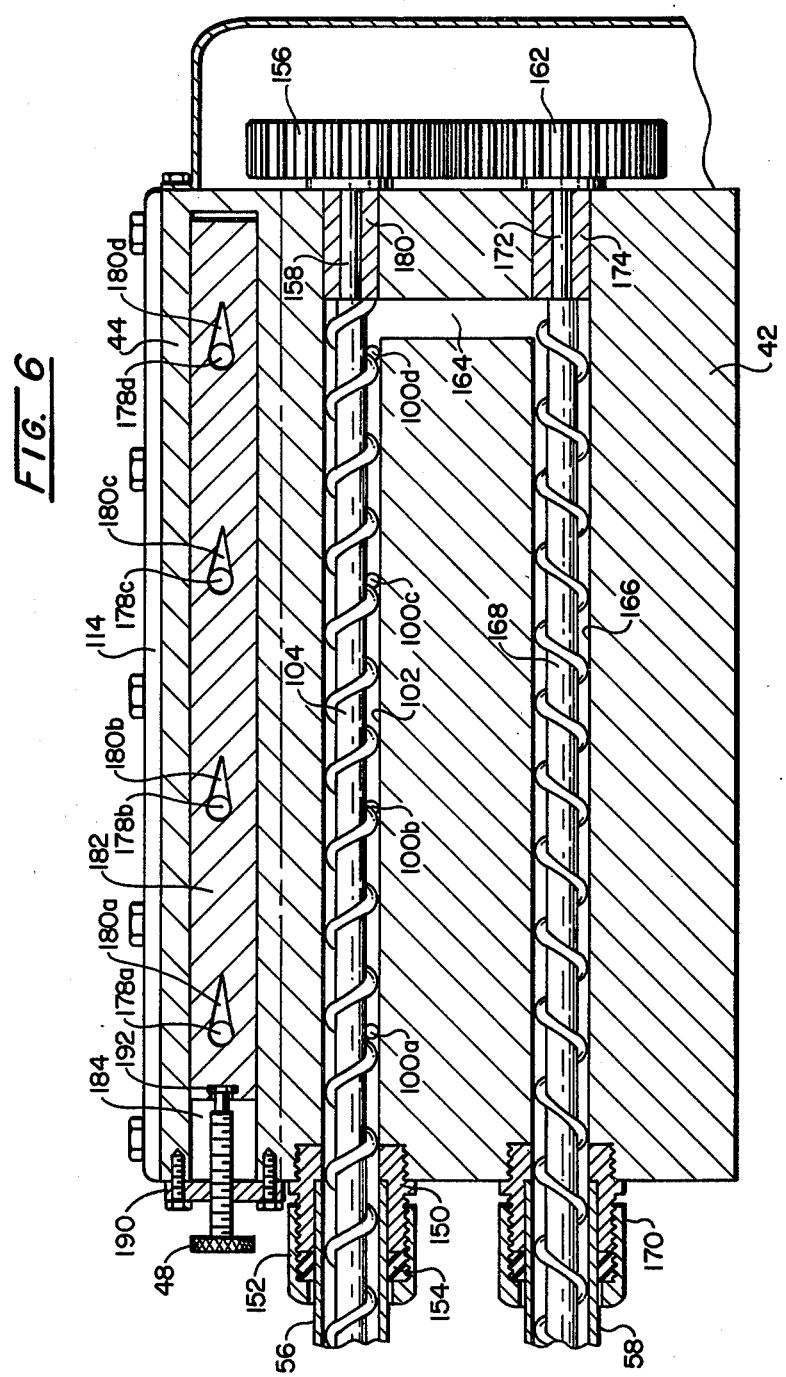
FIG. 6 is a partial offset sectional view taken through the dual planes 6—6 shown in FIG. 2.

Referring to FIG. 6, the fuel transport arrangement for engine 10 as well as the control of pressurized air thereinto is revealed in sectional detail. In this regard, note that fuel supply conduit 56 is shown connected to housing 42 through the utilization of a compression fitting comprised of an internally bored threaded fitting 150 threadably attached to housing 42 over which a compression cap 152 is mounted, the latter cap also being centrally bored to receive conduit 56. A rubber or similarly compressible insert 154 is postioned between fitting 150 and cap 152 as well as over conduit 56. Accordingly, as cap 152 is tightened, conduit 56 is retained in place. Conduit 56 is shown to retain rotated screw conveyor 104, the conveyor, when rotatably driven, serving to deliver particulate fuel across fuel inlet openings 100a–100d. Drive to screw conveyor 104 is provided from gear 156 which is coupled to shaft 158 and thence to conveyor 104. Shaft 158 is shown mounted within a bushing 160 which, in turn, is positioned within a horizontal bore within housing 42. Gear 156 is driven from enmeshment with a gear 162 which, in turn, is driven from earliers described drive gear 140. The latter, alternately, can be driven by a timing belt or the like. Particulate fuel delivered by conveyor 104 passes along internal bore 102 until reaching an intersecting vertical bore 164 whereupon it enters horizontal bore 166. Bore 166, in turn, retains a screw conveyor 168 which extends into return conduit 58. Conduit 58 is coupled with housing 42 utilizing a compression fitting structured identically with that retaining conduit 56. Conveyor 168 is coupled with a shaft extension 172 which is journaled for rotation within a bushing 174 and is fixed to gear 162. Accordingly, with the rotation of gear 162, conveyor 168 is rotated and the corresponding enmeshment of gears 156 and 162 provides for the rotation of conveyor 104 in an opposite rotational sense. As is apparent, the movement of particulate fuel by the transport arrangement is continuous and serves to treat the particulate fuel such that it remains agitated for utilization of portions thereof by diversion into outlets 100a–100d. The "oversupply" of the particulate fuel permits simplified fuel delivery over a broad range of engine speeds.

FIG. 6 also reveals a control over the input of pressurized air from each of the conduits 46. Looking additionally to FIG. 2, it may be observed that the pressurized air input from conduit 40 (FIG. 1) is introduced to a horizontal bore 176 formed within housing 42. Bore 176 is tapped by a series of transverse bores 178a–178d which communicate through corresponding apertures 180a–180d which extend through a governor plate 182. Governor plate 182 slideably nests within a groove 184 formed within the internal surface of air valve housing 44. A transverse bore as shown in FIG. 2 at 186 is coupled with each of the apertures 180a–180d and serves to provide air communication through fittings as at 188 with conduits 46.

Returning to FIG. 6, it may be observed that apertures 180a–180d are configured to exhibit a cross-section of gradually diminishing extent. Accordingly, movement of the governor plate 182 with respect to the cross-sectional bores at 186 provides a control over the amount of compressed or pressurized air which is admitted to engine 10. To provide a fine adjustment of this air input, knob 48 is shown threadably engaged within a plate 190 and is formed having a flanged terminii at 192 which engages a correspondingly shaped slot within plate 182. Thus, rotation of knob 48 provides for a fine adjustment of the position of plate 182. As is apparent, plate 182 also may be utilized to carry out a throttling function.

Figure 7:
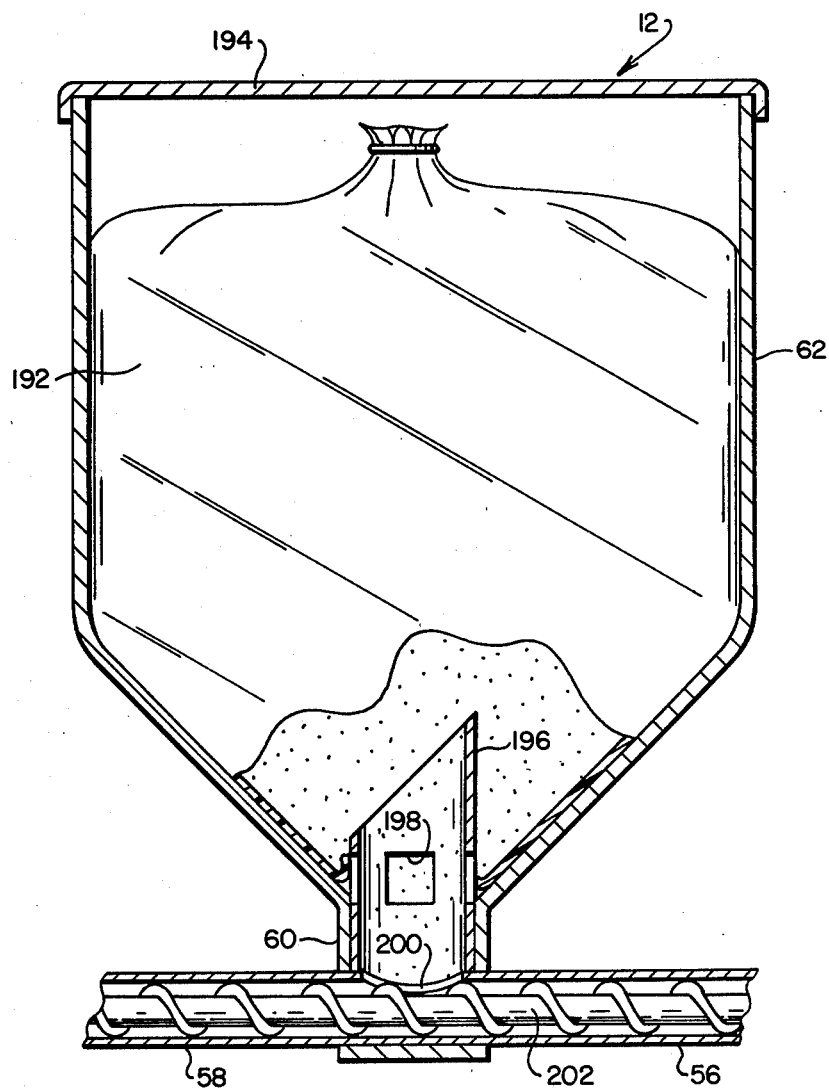
FIG. 7 is a partial sectional view taken through the plane 7—7 of FIG. 1.

Referring to FIGS. 1 and 7, the fuel supply and transport arrangement of the engine 10 is represented in enhanced detail. In this regard, tank 62 is shown in sectional form within which a polymeric container 192 of particulate fuel is positioned. Tank 62 is shown having a cover 194 which may be removed to provide access for container 192. As container 192 is inserted within tank 62, the sharp contoured end of an insertable conduit 196 punctures the container 192 to permit automatic access into the particulate fuel therewithin. It may be observed that conduit 196 is opened at its uppermost end and additionally includes square openings as at 198 through which the particulate fuel may enter under the influence of gravity. Conduit 196 is in communication through an opening 200 with the conveyor components of the transport system. In this regard, note that a singular screw conveyor is provided, the conveyor having end components described earlier herein in conjunction with FIG. 6 at 104 and 168. That portion of the singular conveyor which extends within conduits 56 and 58 beneath conduit 196 is represented in the figure full at 202, it being understood as noted above that a singular screw conveyor is utilized which is driven from the motor. Such conveyor may, for example, be formed of a flexible polymeric material as well as metals or the like.

Figure 3:
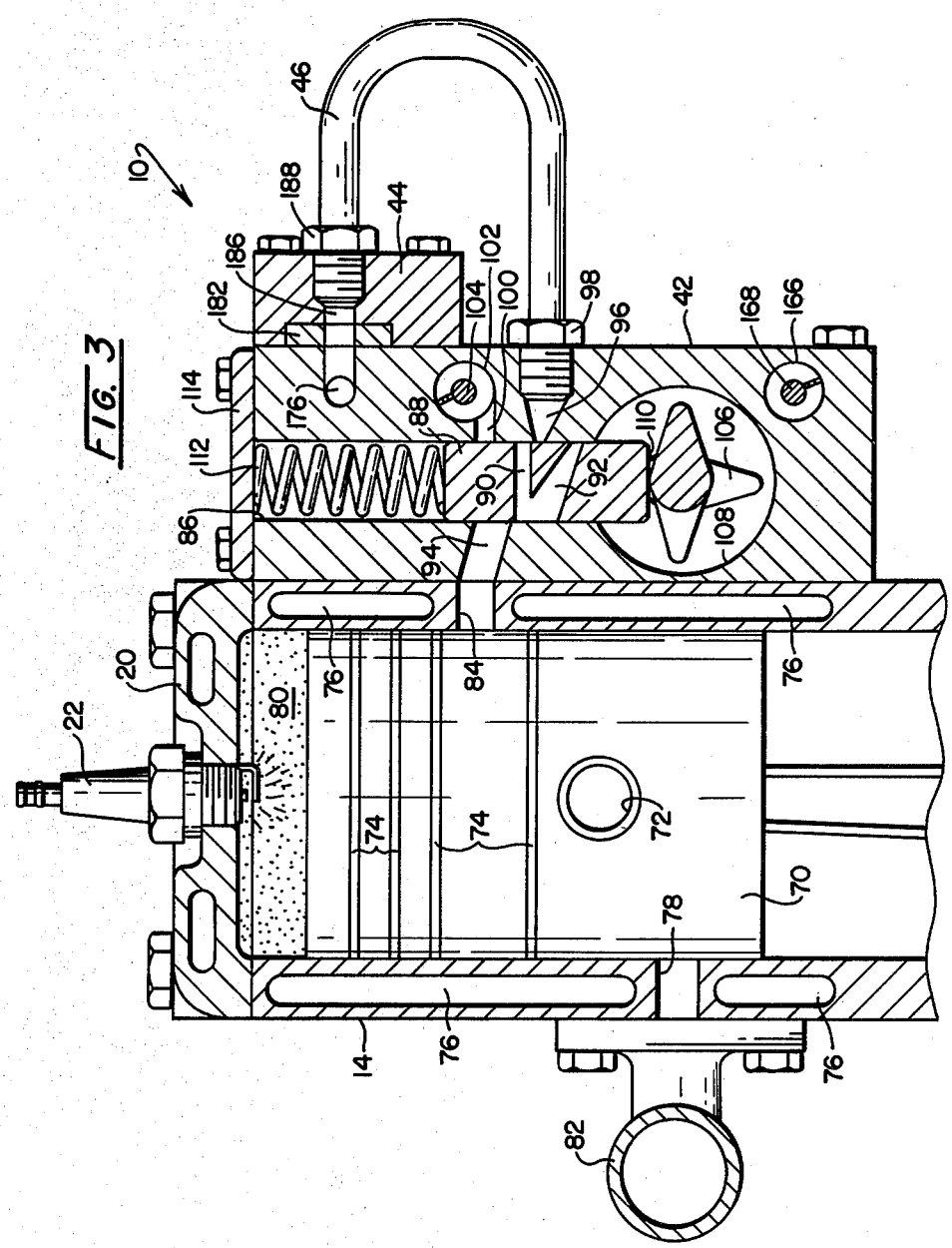
FIG. 3 is a sectional view similar to FIG. 2 and showing the position of components thereof during the ignition portion of a combustion stroke.
Figure 4:
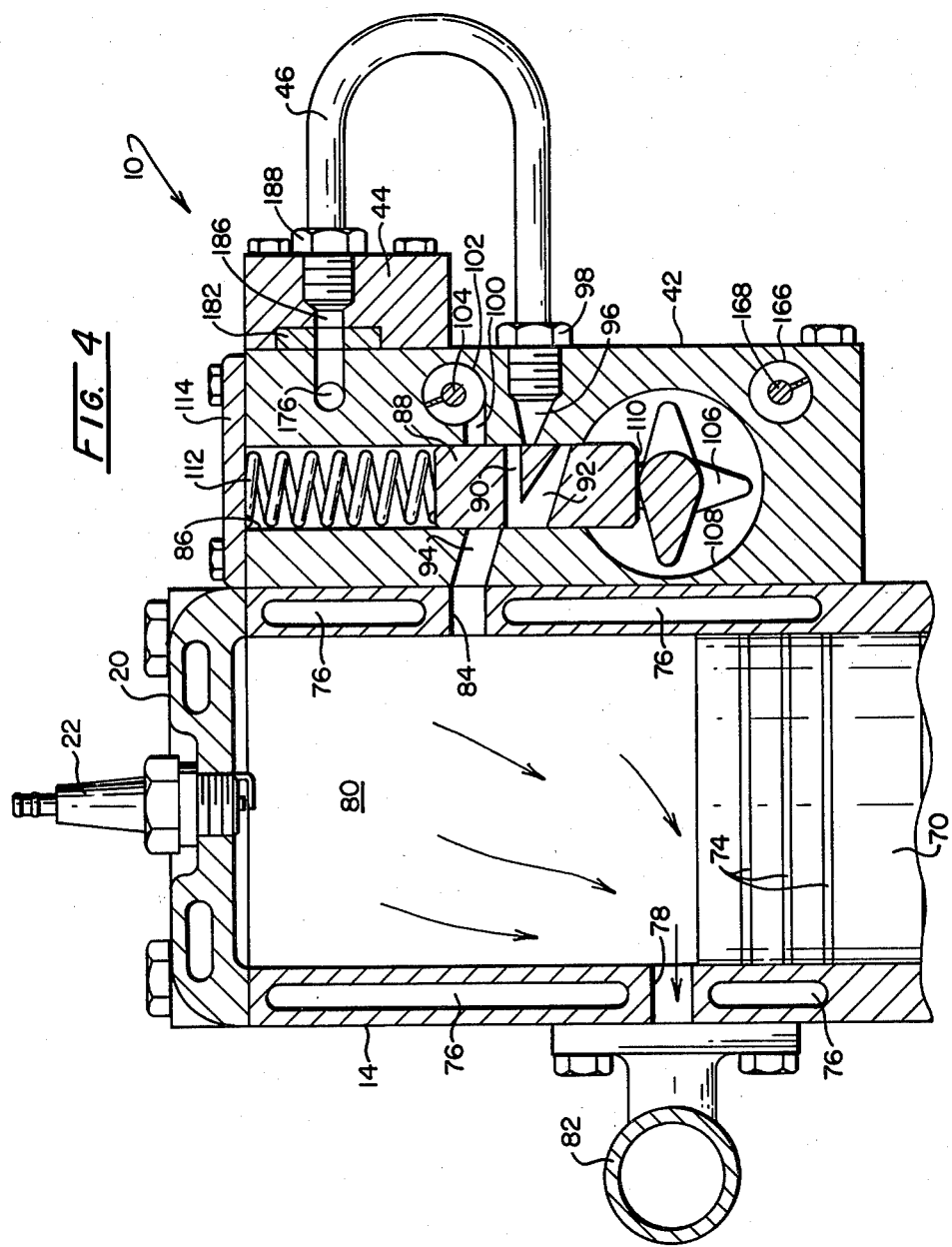
FIG. 4 is a sectional view similar to FIG. 2 showing the orientation of components during the exhaust phase of operation thereof.

Considering now the operation of engine 10, reference is made to FIGS. 2, 3 and 4. In FIG. 2, piston 70 is considered to be moving into a compression condition, the particulate fuel and air being injected through intake port 84 and exhaust port 78 is blocked. Looking to FIG. 3, the compression and ignition portion of the compression stroke is revealed. Note that piston 70 has blocked both intake port 84 and exhaust port 78, and sparkplug 22 will be energized to create ignition and combustion of the now compressed fuel-air suspension. Note additionally that mixer component 88 is in a lower orientation wherein each of the ducts 90 and 92 are blocked. The presence of particulate fuel within duct 90 is of no consequence and valve misfunction difficulties and the like are entirely avoided with the system. Looking to FIG. 4, the piston 70 is at about a bottom dead center orientation, exhaust port 78 is opened to permit the removal of combusted materials through manifold 82 and intake port 84 is inactive, mixer component 88 remaining in an orientation wherein ducts 90 and 92 are blocked. Such a cycle is slightly different than the conventional two-stroke cycle, no scavenging being utilized and fuel injection taking place in the course of the movement of piston 70 in a compression function. Note also may be made of the sharpness of the profile of cam 106 as described in connection with FIG. 5 at 106a–106d. This sharp profile causes mixer component 88 to move in a very rapid or accelerated fashion. Such movement serves, inter alia, to carry out an agitation of any fuel which remains within metering duct 90 during components of a cycle wherein the duct is not utilized for purposes of charging combustion chamber 80.

Since certain changes may be made in the above-described system and apparatus without departing from the scope of the invention herein involved, it is intended that all matter contained in the description thereof or shown in the accompanying drawings shall be interpreted as illustrative and not in a limiting sense.

I claim:

1. In an internal combustion engine with at least one cylinder having a wall defining a combustion chamber within which a piston is positioned for reciprocal movement, the combination comprising:

intake port means extending through said wall for effecting the passage of particulate solid fuel and air into said chamber;

transport means for transporting said particulate fuel in delivery to a fuel outlet;

air supply means for providing air from a pressurized source thereof to an air outlet selectively spaced with respect to said fuel outlet;

injecting valve means positioned adjacent to and having an outlet communicable with said intake port means, a first duct within said injecting valve means extending from a particulate fuel inlet toward said outlet, a second duct within said injecting valve means extending from a pressurized air inlet toward said outlet and configured to join in communication with said first duct to effect the movement of said particulate fuel with said pressurized air through said injecting valve means outlet, said first duct particulate fuel inlet and second duct pressurized air inlet being located upon said injection valve means for movement therewith into communication with respective said fuel outlet and said air outlet, said injecting valve means being actuable to move with respect to said intake port means, said fuel outlet and said air outlet to selectively effect an intermittent conjoining of said pressurized air from said second duct with said particulate fuel from within said first duct and a substantially simultaneous injection thereof into said intake port means; and actuating means for selectively actuating said injecting valve means.

2. The combination of claim 1 wherein said injecting valve outlet means is movable into communication with said intake port means simultaneously with the movement of said first duct into communication with said fuel outlet and simultaneously with the movement of said second duct into communication with said air outlet, so as to effect an air-fuel suspensive mixture in conjunction with the entry of air and fuel through said intake port means.

3. The combination of claim 1 in which said injecting valve means first duct is configured to join with said second duct in the vicinity of said injecting valve means outlet to evoke a suction pressure condition with said first duct to effect a movement of particulate fuel within said first duct toward said outlet.

4. The combination of claim 3 in which said injecting valve means includes:

a fuel injection housing mounted adjacent said cylinder housing wall;

a mixer component mounted for reciprocative movement within said fuel injection housing, said first and second ducts being positioned therewithin; and said actuating means is configured for actuating said mixer component for alternate movement thereof into an orientation effecting the closure of said intake port means, said air outlet and said fuel outlet.

5. The combination of claim 4 in which:

said mixer component includes a cam follower surface; and said actuator means is present as a rotary driven cam having a cam drive profile for contacting and actuating said follower surface in reciprocating fashion; and including means biasing said mixer component into said cam follower surface.

6. The combination of claim 5 wherein:

said rotary driven cam is configured having a rising profile extending from a given point of contact of said drive profile with said follower surface; and said actuator means includes throttle means actuable to selectively vary said given point of contact along said rising profile to effect a corresponding variance of communication of said first and second ducts with respctive said fuel outlet and air outlet.

7. The combination of claim 1 including air control valve means adjustable to selectively vary the amount of air admissible through said air inlet.

8. In an internal combustion engine including at least one cylinder having a combustion chamber within which a piston is positioned for reciprocal movement, the combination comprising:

a bulk source of particulate fuel;

intake port means including an orifice commumicating with said combustion chamber;

injecting valve means having an outlet communicable with said intake port means orifice, having a metering duct extending from a particulate fuel inlet to said outlet, having an air input duct extending from a pressurized air inlet to said outlet and communicating with said metering duct to effect movement of metered quantities of particulate fuel therein, said injecting valve means being actuable to move with respect to said intake port means orifice to selectively effect an intermittent conjoining at said outlet of pressurized air from said air input duct with said particulate fuel from said metering duct to effect an injection thereof through said orifice for evoking a combustible particulate fuel suspension within said combustion chamber;

air supply means for providing air from a pressurized source thereof to an air outlet situate at said injecting valve means and communicable with said pressurized air inlet;

transport means for continuously transporting said particulate fuel in delivery from said bulk source to said injecting valve means and from said injecting valve means, in return, to said source;

fuel outlet means for communicating select portions of transported said bulk fuel from said transport means at said injecting valve means with said particulate fuel inlet; and actuator means for selectively actuating said injecting valve means to move said metering duct into select communication with said fuel outlet means and simultaneously to effect said communication between said air outlet and said pressurized air inlet, to effect said injection of said fuel through said orifice.

9. The combination of claim 8 wherein:

said piston is reciprocal within said combustion chamber to define a two-stroke cycle;

said combustion chamber includes exhaust port means positioned for exhausting combusted matter and located above said piston at a lower extent of said stroke thereof; and said intake port is located along said stroke above said exhaust port means at a position wherein said piston blocks said exhaust port means while said intake port means remains open during a compression phase of said two-stroke cycle.

10. The combination of claim 8 in which:

said bulk source of particulate fuel is contained within a substantially sealed vapor-proof polymeric package;

said transport means includes conveyor means for effecting said delivery and return of said particulate fuel; and insertable conduit means in particulate fuel transfer communication between said package and said conveyor means and injectable into said package to effect said communication.

11. The combination of claim 8 in which said injecting valve means includes:

a fuel injection housing mounted adjacent said cylinder;

a mixer component mounted for reciprocative movement within said fuel injection housing, said metering and air input ducts being positioned therewithin; and said actuating means is configured for actuating said mixer component for alternate movement thereof into an orientation effecting the simultaneous closure of said intake port means, said pressurized air inlet and said particulate fuel inlet.

12. The combination of claim 11 in which:

said mixer component includes a cam follower surface; and said actuator means is present as a rotary driven cam having a cam drive profile for contacting and actuating said follower surface in reciprocating fashion, and including means biasing said mixer component into said cam follower surface.

13. The combination of claim 12 wherein:

said rotary driven cam is configured having a rising profile extending from a given point of contact of said drive profile with said follower surface; and said actuator means includes throttle means actuable to selectively vary said given point of contact along said rising profile to effect a corresponding varience of said metering duct and pressurized air inlet with respective said fuel outlet means.

14. The combination of claim 13 including air control value means adjustable to selectively vary the amount of air admitted through said air outlet.

15. In an internal combustion engine with at least one cylinder having a wall defining a combustion chamber within which a piston is positioned for reciprocal movement, the combination comprising:
   intake port means including an orifice communicating with said combustion chamber for effecting the passage of particulate solid fuel and air thereinto;
   a fuel injection housing mounted adjacent said combustion chamber orifice;
   transport means for transporting said particulate fuel from a source thereof to a fuel outlet within said fuel injection housing;
   air supply means for providing air from a pressurized source thereof to an air outlet within said fuel injection housing;
   a mixer component actuable for movement within said fuel injection housing and having an outlet communicable with said intake port means orifice, a first duct within said component extending from a particulate fuel inlet toward said outlet, a second duct within said component extending from a pressurized air inlet toward said outlet and configured to join with said first duct in the vicinity of said outlet to selectively effect the commencement of entrainment of said particles with air substantially in the vicinity of said intake port means orifice; and
   actuating means for selectively actuating said mixer component to selectively effect the simultaneous communication of said outlet, said particulate fuel inlet and said pressurized air inlet respectively with said orifice, said fuel outlet and said air outlet to effect said commencement of entrainment.

16. The combination of claim 15 in which:
   said mixer component includes a cam follower surface; and
   said actuator means is present as a rotary driven cam having a cam drive profile for contacting and actuating said follower surface in reciprocating fashion.

17. The combination of claim 16 wherein:
   said rotary driven cam is configured having a rising profile extending from a given point of contact of said drive profile with said follower surface; and
   said actuator means includes throttle means actuable to selectively vary said given point of contact along said rising profile.

18. The combination of claim 15 including air control valve means adjustable to selectively vary the amount of air admissible through said air inlet.

19. The combination of claim 15 in which:
   said source of particulate fuel is contained within a substantially sealed vapor-proof polymeric package;
   said transport means is provided as a conveyor means effecting the delivery of said particulate fuel to said fuel outlet and the return of particulate fuel therefrom to said bulk source; and
   insertable conduit means in particulate fuel transfer communication between said package and said conveyor means and injectable into said package to effect said communication.

* * * * *